United States Patent [19]

Wisneskie

[11] Patent Number: 5,534,293
[45] Date of Patent: Jul. 9, 1996

[54] METHOD FOR PRODUCING HAFNIUM CARBIDE SURFACES ON CARBON BASED MATERIALS

[75] Inventor: Bradley D. Wisneskie, Irvine, Calif.

[73] Assignee: Loral Aerospace Corp., New York, N.Y.

[21] Appl. No.: 311,725

[22] Filed: Sep. 23, 1994

Related U.S. Application Data

[63] Continuation of Ser. No. 130,407, Oct. 1, 1993, abandoned, which is a continuation of Ser. No. 887,487, May 21, 1992, abandoned.

[51] Int. Cl.$^6$ ....................................................... B05D 3/02
[52] U.S. Cl. .................. 427/228; 427/294; 427/376.1; 427/377; 427/399
[58] Field of Search ................................. 427/228, 399, 427/376.1, 294, 377

[56] References Cited

U.S. PATENT DOCUMENTS

| Re. 28,485 | 7/1975 | Rix et al. | 427/228 |
|---|---|---|---|
| 3,860,437 | 1/1975 | Gust | 427/228 |
| 3,885,059 | 5/1975 | Komatso et al. | 427/228 |
| 5,006,414 | 4/1991 | Pond | 427/228 |
| 5,141,773 | 8/1992 | Gilbert et al. | 427/228 |

FOREIGN PATENT DOCUMENTS

| 2141532 | 3/1973 | Germany | 427/228 |
|---|---|---|---|

OTHER PUBLICATIONS

Hu, H. S. Joshi, A. and Lee, J. S. "Micro–sturctural Evaluations of a Si–Hf–Cr Fused Slurry Coating on Graphite for Oxidation Protection", Journal of Vacuum Science & Technology, Feb. 1991.

Kaplan, Richard B. and Tuffias, Robert H., "High Temperature Composite Structures Are Fabricated With Deposition Process," Research & Development, Feb. 1989, pp. 118–120.

*Primary Examiner*—Janyce Bell
*Attorney, Agent, or Firm*—Anthony W. Karambelas

[57] ABSTRACT

A method for treating surfaces of carbon based materials produces a layer of hafnium carbide with no significant change of the location of the surface or the dimension of the part being treated. A slurry containing elemental hafnium is applied to this surface. The surface is heat treated in a vacuum furnace, causing the hafnium in the slurry to form an HfC layer within the material, and remove all other slurry materials from the surface. In a variation of the method, the slurry may also contain silicon and chromium to catalyze the reaction. The treated surface exhibits improved properties for components of high temperature gas flow handling systems. The method is useful for valves and ducts having complex internal surface geometries.

35 Claims, 5 Drawing Sheets

METHOD FOR PRODUCING HAFNIUM CARBIDE SURFACES ON CARBON BASED MATERIALS

This application is a continuation of U.S. patent application Ser. No. 08/130,407, filed Oct. 1, 1993, now abandoned, which is a continuation of U.S. patent application Ser. No. 07/887,487, filed May 21, 1992, now abandoned.

TECHNICAL FIELD

This invention is related generally to the field of fabricating techniques for materials used in flow-handling systems for hot gases, and more particularly to methods for treating the surfaces of valves and ducts in channeling systems for such gases.

BACKGROUND ART

The materials that are used in devices to control the flow of hot gases are subject to special mechanical, thermal, and often chemical requirements. For example, the control of a solid propellant missile is achieved by regulating and directing the flow of hot exhaust gases produced by combustion of the propellant, and this flow control is accomplished by means of valves, ducts, nozzles and the like that are continuously exposed to these hot gases. The exposed surfaces of the flow-controlling means must be comprised of materials that are compatible with the flow velocity and gas temperature, and also with the chemical composition of the exhaust gas. In this particular application, the material density is also a matter of concern because of the desirability of lightness in the weight of the missile.

Carbon based materials are often useful for this application. In some cases, graphite and carbon composites have been found to be preferred materials. They have the desirable feature of low density, and they maintain their strength relatively well at high temperatures. However, these materials also have the drawback of low hardness, so that they tend to erode in the presence of high-velocity gas flow. Furthermore, these materials are susceptible to chemical attack by certain compositions of the flowing gases at high temperatures.

Therefore, the exposed surfaces of flow-handling devices composed of graphite, or other carbon based materials, are generally treated to overcome these drawbacks. The treatment usually consists of converting the exposed surface to a layer of ceramic material to improve the resistance to abrasion, particulate impact and chemical attack, as well as the surface strength, under the exposure to flowing high temperature corrosive gases. Various elements and compounds have been used to form these surface layers, including oxides of boron, phosphorus, silicon, aluminum, and chromium, silicides and silicon based coatings, and carbides of silicon and various metals.

Coated carbon-based surfaces in some cases suffer from a further drawback caused by the thermal expansion mismatch between a coating and the substrate. When the surface is exposed to high temperature gas flow, this mismatch can result in cracks in the coating and degradation of adhesion between the coating and the substrate. This problem is especially serious for graphite and other carbon-carbon composites because of their very low coefficient of thermal expansion. Multilayer coatings have been developed in which the composition of the layers is varied so that the coefficient of thermal expansion is graded from the substrate to the outermost layer. This technique only partially improves the performance of carbon-carbon composite materials.

In addition to carbon-carbon composites, materials have been fabricated of metal-matrix and ceramic-ceramic constituents and found to exhibit the desirable properties of low density and superior performance under high temperature conditions. A further technology for fabricating materials with these properties is the use of refractory foams. This technology is described in the article by Richard B. Kaplan and Robert H. Tuffias entitled "High Temperature Composite Structures Are Fabricated With Deposition Process," published in *Research & Development*, February 1989, pages 118–120. This article describes materials comprised of porous carbon foam with a coating of refractory material deposited on the internal pore surfaces. Examples of refractory materials that can be used include niobium, tantalum, rhenium, tungsten, and the platinum group metals. In addition, the oxides, nitrides, carbides, and borides of these metals are suitable, as well as those of hafnium, zirconium, titanium and silicon. The external surfaces of the foam may be closed out or "skinned" by applying a nonporous sheet of adherent material to these surfaces. These refractory foam materials may be manufactured to exhibit improved mechanical and thermal properties, and the density of the material may be varied within a certain range, depending on the constituents of the material.

In all of the foregoing techniques, the most common method of applying a surface coating is by chemical vapor deposition (CVD). For refractory foam materials, a variant of this method is used, known as chemical vapor infiltration (CVI). The CVD technique is a well-known method that is used for surface treatment and fabrication of layered materials in many applications other than the manufacturing of control systems for high temperature gas flow. However, it has the drawback of being inherently expensive and time consuming. It is often difficult, if not impossible, to use this method for surfaces having a complex geometry such as the internal surfaces of valves or gas flow passages. Furthermore the buildup of coating on a surface by CVD may produce dimensional changes in a given physical part. Such changes must be taken into account in designing parts that are intended to fit or mesh together, such as screw threads or pistons and cylinder bores.

Another method for surface treatment is the slurry coating technique. Less development has been done on this method than on the CVD method. However, the slurry coating technique has the ability to provide contiguous coatings on rough surfaces, and the method requires no major equipment expenditures. This method consists basically of mixing powders of desired elements with a carrier fluid to form a slurry, having a viscosity that is sufficient to allow the slurry to be painted, sprayed or otherwise coated on the surface that is being treated. The surface is coated with the slurry by painting, spraying, dipping or similar methods, and the slurry adheres to the surface. The surface is then heated to a temperature such that the carrier fluid evaporates and the powder particulates react chemically, both with each other and with the substrate. The reactions cause the desired coating to form on the surface.

This slurry coating method has been applied to refractory metals and alloys for high temperature oxidation protection. It has also been used to produce a protective coating of carbides on a graphite surface. This research is described in the paper by H. S. Hu, A. Joshi and J. S. Lee entitled "Micro-structural Evaluations of a Si-Hf-Cr Fused Slurry Coating on Graphite for Oxidation Protection," published in the *Journal of Vacuum Science & Technology*, February 1991. The authors prepared a slurry with a powder mixture having the composition by weight percent: 60%Si-30%Hf-10%Cr. The carrier fluid was an organic lacquer vehicle, which was reportedly an organic binder in acetone. The authors stated that the coating was applied to a density of 14–16 mg/cm$^2$ on a pyrolitic graphite surface, and then subjected to a vacuum fusion treatment at a temperature of 1450° C., for a period of 45 minutes. The process was repeated to assure a complete and dense coating by applying a second coat. The complete coating was comprised of several layers containing various different metal carbides and silicon carbide. The authors noted some local oxidation of the graphite that was believed to be due to a crack in the coating, allowing oxygen to penetrate and oxidize the graphite. The oxidation resistance of the coating itself was attributed largely to the formation of silicon dioxide on the outermost surface layer.

This slurry coating method suffers from the same drawback as the CVD coating techniques discussed previously, namely that the buildup of the coating layers results in dimensional changes of the parts that are being treated. For high temperature gas flow systems with complex geometries, and for flow passages where the dimensions are critically important, it is desirable to overcome this drawback of the slurry coating technique.

In the slurry coating research mentioned above, it was found that the innermost layer of the coating was comprised largely of hafnium carbide. It was also reported that the free energy of formation at elevated temperatures is lower for hafnium carbide, and some chromium carbides, than for silicon carbide. Thus it is desirable to provide a method for treating surfaces of carbon-based materials, particularly graphite, to form protective layers of metal carbide, particularly HfC, without substantial changes in the dimensions of material or location of the surface, in a manner applicable to internal and external surfaces having complex geometry.

DISCLOSURE OF INVENTION

The subject invention is a process for treating the surface of a carbon based material to convert it to a hafnium carbide ceramic. The process uses elemental hafnium to chemically react with the carbon in the surface to form HfC, to a depth which depends on the process variables. The process includes application of a coating slurry that includes hafnium and silicon in an approximate weight ratio of 30:70 respectively. Following this application of the slurry, the surface is heated to elevated temperatures in a vacuum for a certain period of time and then cooled to room temperature.

In an alternative process, the slurry includes hafnium without the silicon. The slurry is applied to the surface, and then heated in a vacuum, or an inert atmosphere, to a temperature above the melting point of hafnium. The time period over which this temperature is maintained is generally less than the period of the first process described above. The surface is then cooled to room temperature.

In both of the above processes, the resulting surface after treatment is comprised of a layer of hafnium carbide down to a certain controlled depth. The high temperature treatment causes the other materials in the slurry to become removed from the surface, so that the composition of this surface layer is limited to materials formed from the elements hafnium and carbon. The dimensional change of the surface is insignificant; the hafnium carbide region lies substantially within the original surface, rather than being formed as a layer on top of this surface. The treated surface has improved properties regarding strength, abrasion resistance, and resistance to particulate and chemical attack by high temperature corrosive fluids.

DETAILED DESCRIPTION OF THE PREFERRED EMBODIMENTS

Figure 1:
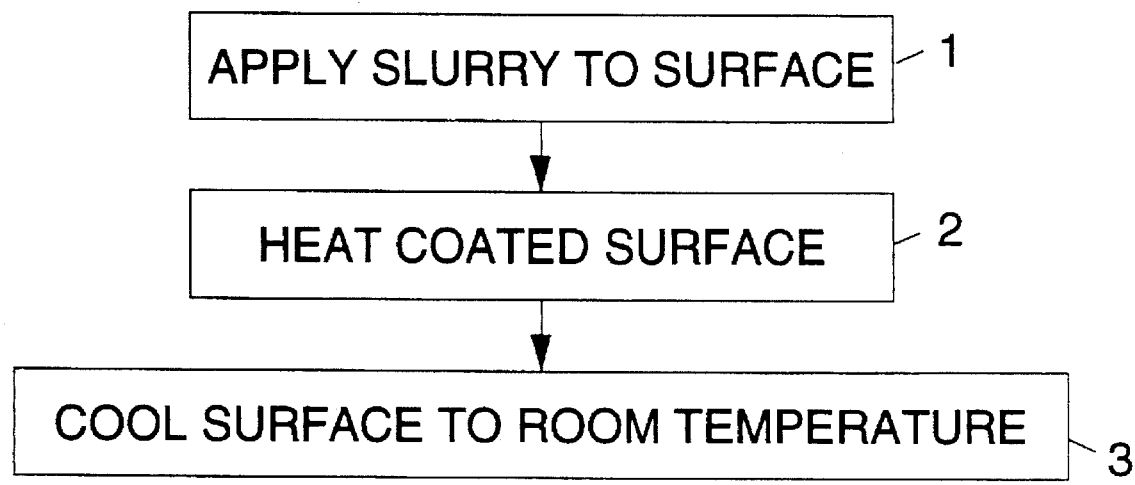
FIG. 1 is a flow chart showing the steps of the method of the present invention.

The present invention is an improvement over previously known slurry coating methods for treating surfaces of carbon based materials, for use in high-temperature gas flow control systems. FIG. 1 shows the basic steps of the method including the improvements herein. Two embodiments of this method are described below for the case where the method is used to treat a graphite surface.

In a first embodiment, hereafter termed Method I, the first step 1 of the method is to coat the surface with a slurry. This may be done by painting or spraying the surface with the slurry, dipping the surface into the slurry, or any other coating method. The slurry is comprised of a mixture of hafnium, silicon and chromium in powder form in a carrier fluid. The weight ratio of hafnium to silicon in the slurry is approximately 30:70. This ratio can be varied to some degree within the scope of this invention, and the desired results are still obtained. The slurry powder also contains approximately 10 percent (by weight) chromium. The carrier fluid is an organic lacquer vehicle which may contain nitrocellulose, acetone, and a thixotrope for thickening the consistency of the slurry. As an example, Method I has been carried out using a slurry having a composition according to the following recipe:

| Ingredient | Amount |
| --- | --- |
| Silicon Powder | 3,630 ± 36 grams |
| Hafnium Powder | 1,820 ± 18 grams |
| Chromium Powder | 605 ± 6 grams |
| Nitrocellulose | 835 ± 15 milliliters |
| Thixotrope (MPA-60) | 435 ± 5 grams |
| Acetone | 1,770 ± 17 milliliters |

Other slurry compositions may be used. The requirements of a suitable slurry are that the density and viscosity of the complete slurry produce a consistency similar to that of paint, suitable for coating the particular surface to be treated by whatever coating method is desired, and that the slurry binds the hafnium to the graphite surface. After being applied to the surface, the slurry is allowed to dry.

The second step 2 of Method I is to heat the subject surface in a vacuum furnace to a temperature of 2800 degrees F. at a vacuum pressure of $10^{-5}$ torr or less. This temperature is maintained for a period of one hour typically. The vacuum is maintained during this period.

The third step 3 of Method I is to allow the surface to cool down to room temperature. During this cool-down period the vacuum is maintained. At the end of this cool-down period, the treatment process is complete.

In a second embodiment, hereafter termed Method II, the first step 1 of the method is to coat the surface with a slurry containing only hafnium powder in a carrier fluid. The carrier may be typically 2% XUS in isopropyl alcohol. The slurry carrier ingredient "XUS" is a product manufactured by Dow Chemical Company, having the product name XUS 4030.00. This product has the chemical designation poly (2-ethyl-2-oxazoline). This carrier fluid composition is one example that is suitable for carrying out Method II, and other compositions may also be used. The requirements for a suitable carrier fluid are the same as the carrier fluid of Method I.

The second step 2 is to heat the surface in a vacuum, or in an inert atmosphere such as argon, to a temperature above the melting point of hafnium. This temperature is typically 4350° F., which exceeds the hafnium melting point of 4040° F. by several hundred degrees. The surface is maintained at this temperature for a period of at least five minutes.

The third step 3 of Method II is to allow the surface to cool down to room temperature, while maintaining the vacuum or inert atmosphere. At the end of this period the treatment process is complete.

The difference between the two embodiments lies in the slurry composition and the heat treatment variables. In Method I, the slurry contains silicon which acts as a catalyst to promote the formation of hafnium carbide. The heat treatment step at 2800° F. is carried in a vacuum to avoid the formation of oxides of silicon on the surface. This treatment lasts for one hour, during which any residue from the slurry and any materials containing silicon or chromium are evaporated, sublimed or otherwise baked off from the subject surface, leaving behind only hafnium carbide. In Method II, on the other hand, the slurry contains only hafnium in the carrier fluid. The heat treatment is carried out at a much higher temperature, 4350° F., which allows the hafnium carbide formation reaction to proceed without the silicon catalyst. At this temperature the heat treatment process takes place in only five minutes, and there are no compounds containing metal or silicon that must be baked off from the surface. For both embodiments, it is seen that a further desirable characteristic of the slurry carrier fluid is that the amount of ash or residue be minimized when the carrier material is baked off from the surface.

Figure 2A:
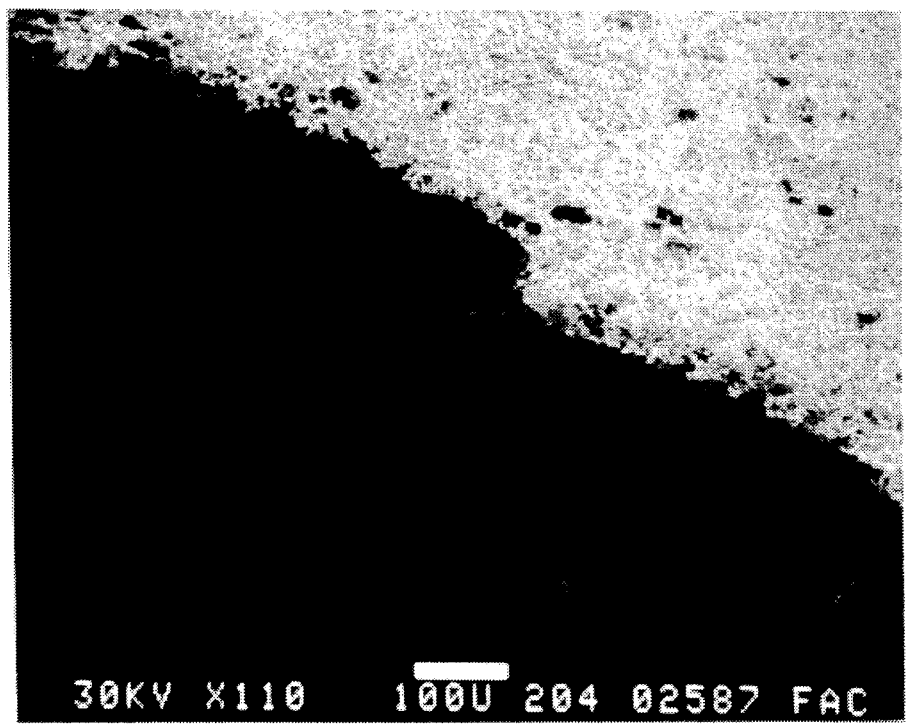
FIG. 2a is a Scanning Electron Microscope (SEM) photograph of a graphite test sample treated according to this invention, showing the graphite substrate (black crystals) and the layer of HfC at the surface (white crystals).
Figure 2B:
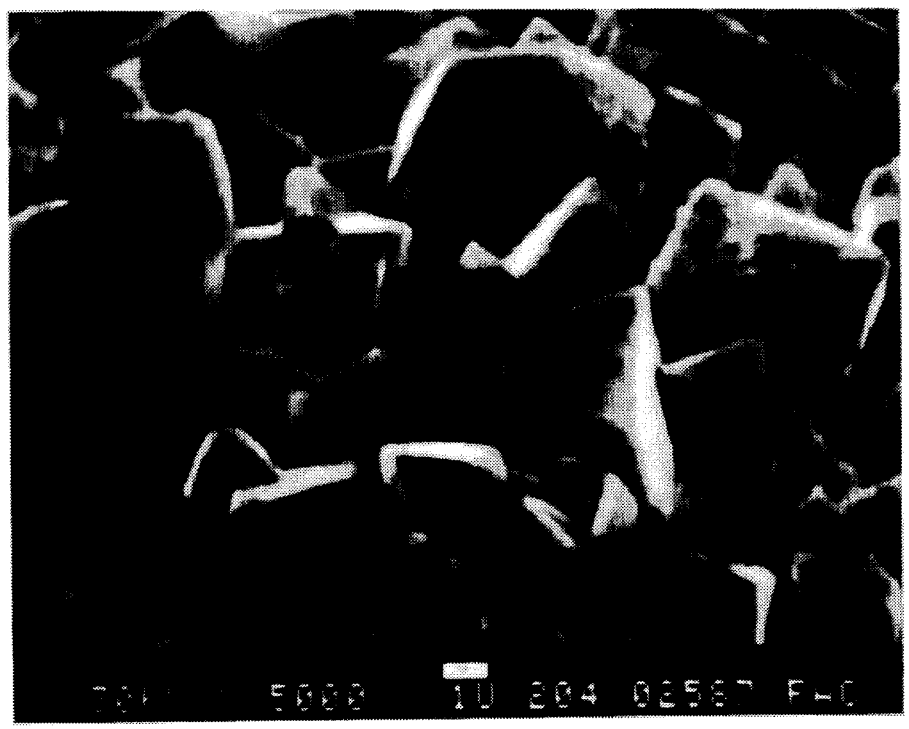
FIG. 2b is an enlargement of a portion of the surface layer of FIG. 2a with 5000× magnification.

Both of the foregoing embodiments of the method have been successfully carried out on graphite test sample surfaces. These tests include internal surfaces of actual valve hardware with complex internal flow geometries. FIG. 2a shows a Scanning Electron Microscope (SEM) photograph of the test sample treated in accordance with Method I. FIG. 2b is an enlargement of a portion of the surface layer shown in FIG. 2a, magnified by a factor of 5000. The Figures show a sample that has been sectioned to illustrate the formation of the hafnium carbide layer (white crystals) over the graphite substrate (black crystals). The boundary between these layers is fairly well-defined, as seen from these photographs.

Figure 3:
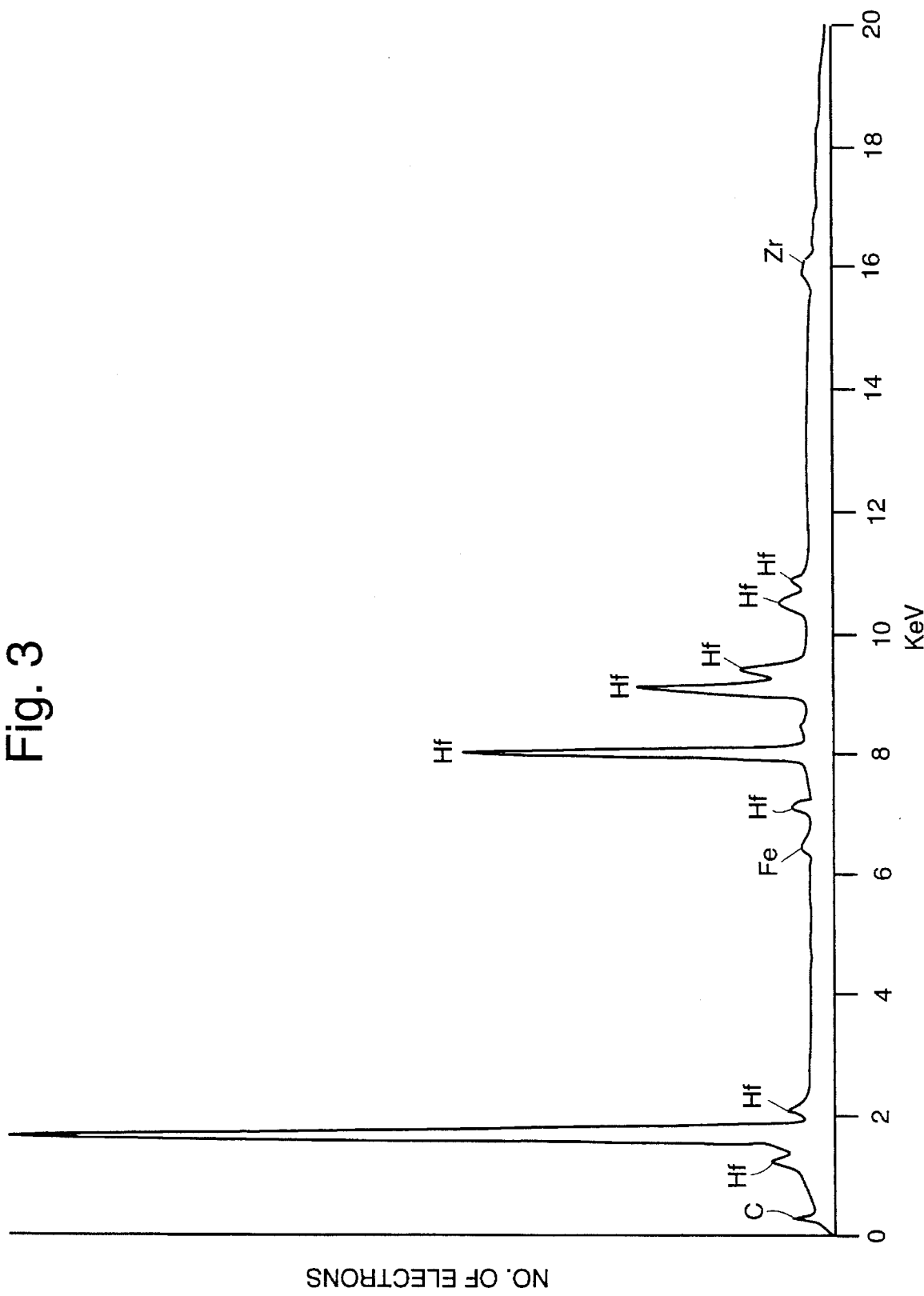
FIG. 3 is a plot of an Electron Dispersive Spectroscopy (EDS) analysis of the treated surface showing the presence of hafnium and carbon.

FIG. 3 is a plot of an Electron Dispersive Spectroscopy (EDS) analysis of the surface layer produced by the treatment process of Method I. The peaks in the emitted electron spectrum correspond to atomic levels in the surface layer material, and these peaks are labelled according to the particular atomic element giving rise to each peak. This EDS spectrum shows clearly that the layer material contains largely hafnium (and carbon) with some trace elements present, such as iron.

Figure 4:
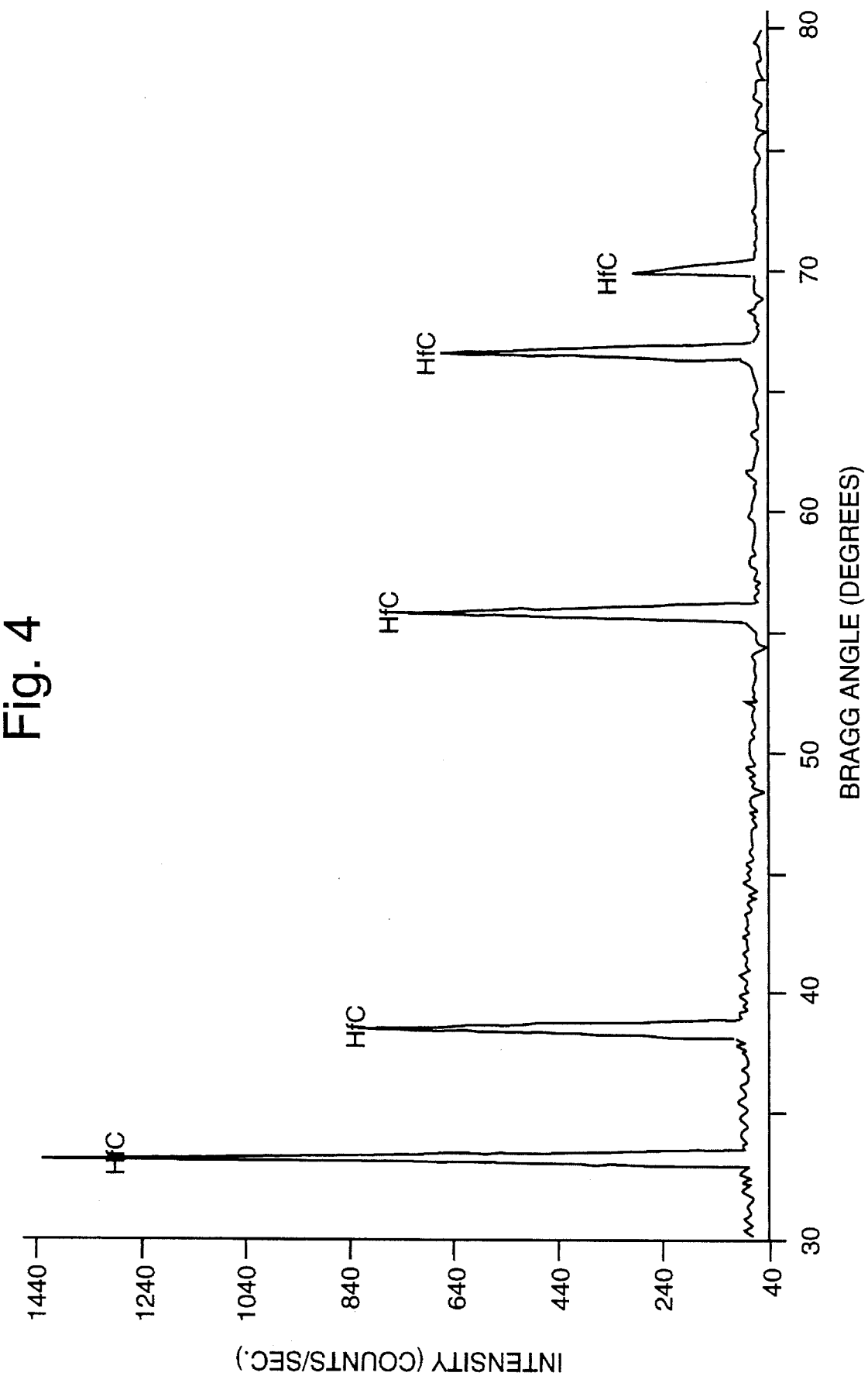
FIG. 4 is an X-ray diffraction analysis of a graphite surface treated in accordance with the first embodiment of the method of the present invention.

FIG. 4 shows an X-ray diffraction analysis of the surface layer material produced by the treatment process of Method I. This analysis is a plot of the intensity of the diffracted X-rays from the sample as a function of the Bragg scattering angle. The peaks in the diffracted intensity identify the crystal structure of the diffracting material. These peaks shown in the Figure indicate that the sample crystal structure is that of HfC.

Figure 5:
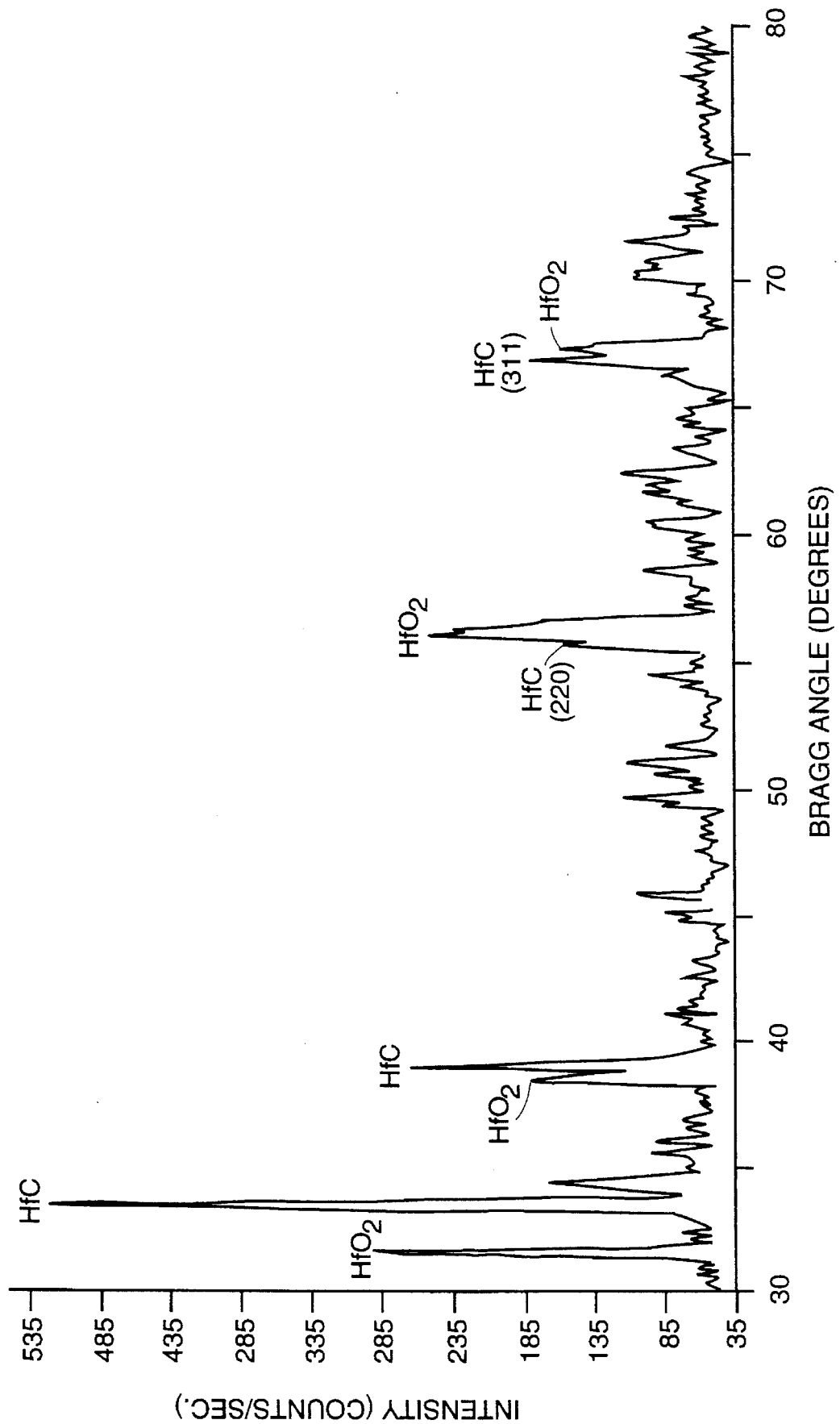
FIG. 5 is an X-ray diffraction analysis of a graphite surface treated in accordance with the second embodiment of the method of the present invention.

Similar analyses have been carried out for the test sample surfaces treated according to Method II. This method also leads to the formation of a surface layer containing hafnium and carbon. FIG. 5 shows an X-ray diffraction analysis of the surface layer material produced by Method II. The peaks in the diffracted X-ray intensity again identify the crystal structure of the surface layer material as being that of HfC.

The thickness of the surface layer produced by the foregoing embodiments of the method of this invention is typically in a range from approximately 0.005 to 0.010 inches. This depth can be varied somewhat by varying the parameters of the process. The location of this layer is such that the overall dimensional change in the surface location is approximately in the range from 0.00025 inches to 0.0005 inches. This variation falls within normal machining tolerances and is insignificant for practical purposes. Therefore, the HfC layer formed by this method lies substantially within the region occupied by the carbon-based material near the original surface. For many applications, parts can be machined to given dimensions and then subjected to this surface treatment method without allowing for any surface coating thickness in the machining process.

The method also has the advantages of being adaptable to internal surfaces having complex geometries, such as valves and ducts in a flow control system for high temperature gases. The treated surface has improved properties regarding strength, abrasion resistance, and resistance to particulate and chemical attack by high temperature corrosive fluids.

The foregoing description of the preferred embodiments of the invention is presented only for purposes of illustration and description. It is not intended to be exhaustive or to limit the invention to the precise forms disclosed, and obviously many modifications and variations are possible in light of the above teaching. These embodiments are chosen and described in order to best explain the principles of the invention and its practical applications to thereby enable others skilled in the art to best utilize the invention in various embodiments and with various modifications as are suitable to the particular use contemplated. It is intended that the spirit and scope of the invention are to be defined by reference to the claims appended hereto.

I claim:

1. A method for treating the surface of a carbon based material, comprising the steps of:

coating the surface with a slurry comprising the element hafnium and a carrier fluid;

drying said coating;

heating said surface in either a vacuum or an inert atmosphere to a temperature above 2650 degrees Fahrenheit for a sufficient time period to cause formation of a layer containing only hafnium carbide substantially disposed within the surface of the carbon based material, and to remove substantially all other slurry materials from said surface; and cooling said surface to room temperature.

2. A method according to claim 1, wherein said slurry also contains the element silicon.

3. A method according to claim 2, wherein the weight ratio of hafnium to silicon in said slurry is substantially the ratio 30:70.

4. A method according to claim 3, wherein said slurry also contains the element chromium.

5. A method according to claim 4, wherein during said heating step the surface is maintained in a vacuum.

6. A method according to claim 4, wherein the weight amount of chromium in said slurry is approximately 10 percent of the total weight amount of silicon, hafnium and chromium in said slurry.

7. A method according to claim 6, wherein during said heating step the surface is maintained in a vacuum.

8. A method according to claim 3, wherein during said heating step the surface is maintained in a vacuum.

9. A method according to claim 3, wherein the surface temperature in said heating step is substantially 2800 degrees Fahrenheit.

10. A method according to claim 9, wherein during said heating step the surface is maintained at said surface temperature for a period of at least one hour.

11. A method according to claim 10, wherein during said heating step the surface is maintained in a vacuum.

12. A method according to claim 9, wherein during said heating step the surface is maintained in a vacuum.

13. A method according to claim 2, wherein during said heating step the surface is maintained in a vacuum.

14. A method according to claim 2, wherein said slurry also contains the element chromium.

15. A method according to claim 14, wherein during said heating step the surface is maintained in a vacuum.

16. A method according to claim 1, wherein the surface temperature in said heating step exceeds the melting point temperature of the element hafnium.

17. A method according to claim 16, wherein said surface temperature is substantially 4350 degrees Fahrenheit.

18. A method according to claim 17, wherein during said heating step the surface is maintained at said temperature for a period of at least five minutes.

19. A method according to claim 18, wherein during said heating step the surface is maintained in a vacuum.

20. A method according to claim 18, wherein during said heating step the surface is maintained in an inert atmosphere.

21. A method according to claim 17, wherein during said heating step the surface is maintained in a vacuum.

22. A method according to claim 17, wherein during said heating step the surface is maintained in an inert atmosphere.

23. A method according to claim 16, wherein during said heating step the surface is maintained in a vacuum.

24. A method according to claim 16, wherein during said heating step the surface is maintained in an inert atmosphere.

25. A method for treating the surface of a carbon based material, comprising the steps of:

coating the surface with a slurry containing the elements hafnium and silicon in a ratio of substantially 30:70;

drying said coating;

heating said surface in either a vacuum or an inert atmosphere to a temperature of substantially 2800 degrees Fahrenheit for a sufficient time period to cause said hafnium to form a layer of hafnium carbide within the carbon based material surface and to remove substantially all other slurry materials from said surface; and cooling said surface to room temperature.

26. A method according to claim 25, wherein during said heating step the surface is maintained at said surface temperature for a period of at least one hour.

27. A method according to claim 26, wherein during said heating step the surface is maintained in a vacuum.

28. A method according to claim 25, wherein during said heating step the surface is maintained in a vacuum.

29. A method for treating the surface of a carbon based material, comprising the steps of:

coating the surface with a slurry containing the element hafnium; drying said coating;

heating said surface in either a vacuum or an inert atmosphere to a temperature of substantially 4350 degrees Fahrenheit for a sufficient time period to cause said hafnium to form a layer of hafnium carbide within the carbon based material surface and to remove substantially all other slurry materials from said surface; and cooling said surface to room temperature.

30. A method according to claim 29, wherein during said heating step the surface is maintained at said surface temperature for a period of at least five minutes.

31. A method according to claim 30, wherein during said heating step the surface is maintained in a vacuum.

32. A method according to claim 29, wherein during said heating step the surface is maintained in a vacuum.

33. A method for treating the surface of a carbon based material, comprising the steps of:

coating the surface with a slurry comprising the element hafnium in a carrier fluid;

drying said coating;

heating said surface in either a vacuum or an inert atmosphere to a temperature above the melting point of hafnium for a sufficient time period to cause said hafnium to form a layer containing only hafnium carbide substantially disposed within the surface of the carbon based material, such that said surface dimensions remain substantially unchanged after heating; and cooling said surface to room temperature.

34. A method according to claim 33, wherein during said heating step the surface is maintained in a vacuum.

35. A method according to claim 33, wherein during said heating step the surface is maintained in an inert atmosphere.

* * * * *